United States Patent [19]
Watwood et al.

[11] Patent Number: 5,263,729
[45] Date of Patent: Nov. 23, 1993

[54] WHEELCHAIR DRIVER AND BRAKING SYSTEM

[76] Inventors: Brian M. Watwood, 6650 Arabian Cir., Roseville, Calif. 95661; Errol Armstrong, 15755 Alto Way, Salinas, Calif. 93907

[21] Appl. No.: 830,872

[22] Filed: Feb. 4, 1992

[51] Int. Cl.⁵ ............................................. B62M 1/16
[52] U.S. Cl. .................. 280/246; 280/250.1; 188/2 F
[58] Field of Search ............ 280/250.1, 246, 255; 188/2 F, 20

[56] References Cited

U.S. PATENT DOCUMENTS

| | | |
|---|---|---|
| 654,986 | 7/1900 | Krueger . |
| 838,228 | 12/1906 | Williams . |
| 2,643,898 | 6/1953 | Everest et al. . |
| 3,189,368 | 6/1965 | Petersen ............ 280/250.1 |
| 3,869,146 | 3/1975 | Bulmer ............. 280/250.1 |
| 3,877,725 | 5/1975 | Barroza ............ 280/250.1 |
| 4,354,691 | 10/1982 | Saunders et al. .... 280/250.1 |
| 4,453,729 | 6/1984 | Lucken . |
| 4,506,900 | 3/1985 | Korosue . |
| 4,735,431 | 4/1988 | Tait . |

FOREIGN PATENT DOCUMENTS

| | | | |
|---|---|---|---|
| 1067901 | 5/1967 | United Kingdom ............. 280/250.1 |
| 2110780 | 6/1983 | United Kingdom ............... 188/2 F |
| 2213438 | 8/1989 | United Kingdom ............. 280/250.1 |

Primary Examiner—David M. Mitchell
Assistant Examiner—Gary C. Hoge
Attorney, Agent, or Firm—Bernhard Kreten

[57] ABSTRACT

A wheelchair driver having a simple, efficient structure is mountable to a horizontal frame extension of a wheelchair between a wheel and the wheelchair's frame. The driver is mounted directly to a spindle sleeve fastened to the horizontal frame extension which provides a race for the driver to run upon. The spindle sleeve also isolates the driver from the wheel preventing any friction between the wheel and the driver. The driver has a lever extending upward from the spindle sleeve above the tire of the wheel. A handle is provided on the uppermost end for a user. The lever has a pawl extending over the tire of the wheel. The pawl has teeth on a lower surface and contacts against the tire. When the lever is rotated around the spindle sleeve the pawl teeth grab the tire causing the wheelchair to move. When the lever is stopped or rotated oppositely, the pawl teeth release the tire and allow the wheelchair's momentum to move the wheelchair until another forward rotation of the lever provides additional force. Brake pads on the lever, adjacent to rims of the wheels, are forcible against the rims providing the user with a wheelchair brake. The wheelchair driver provides a user with a safe and efficient method of wheelchair motivation which does not require gripping and releasing of any moving part of the wheelchair.

22 Claims, 4 Drawing Sheets

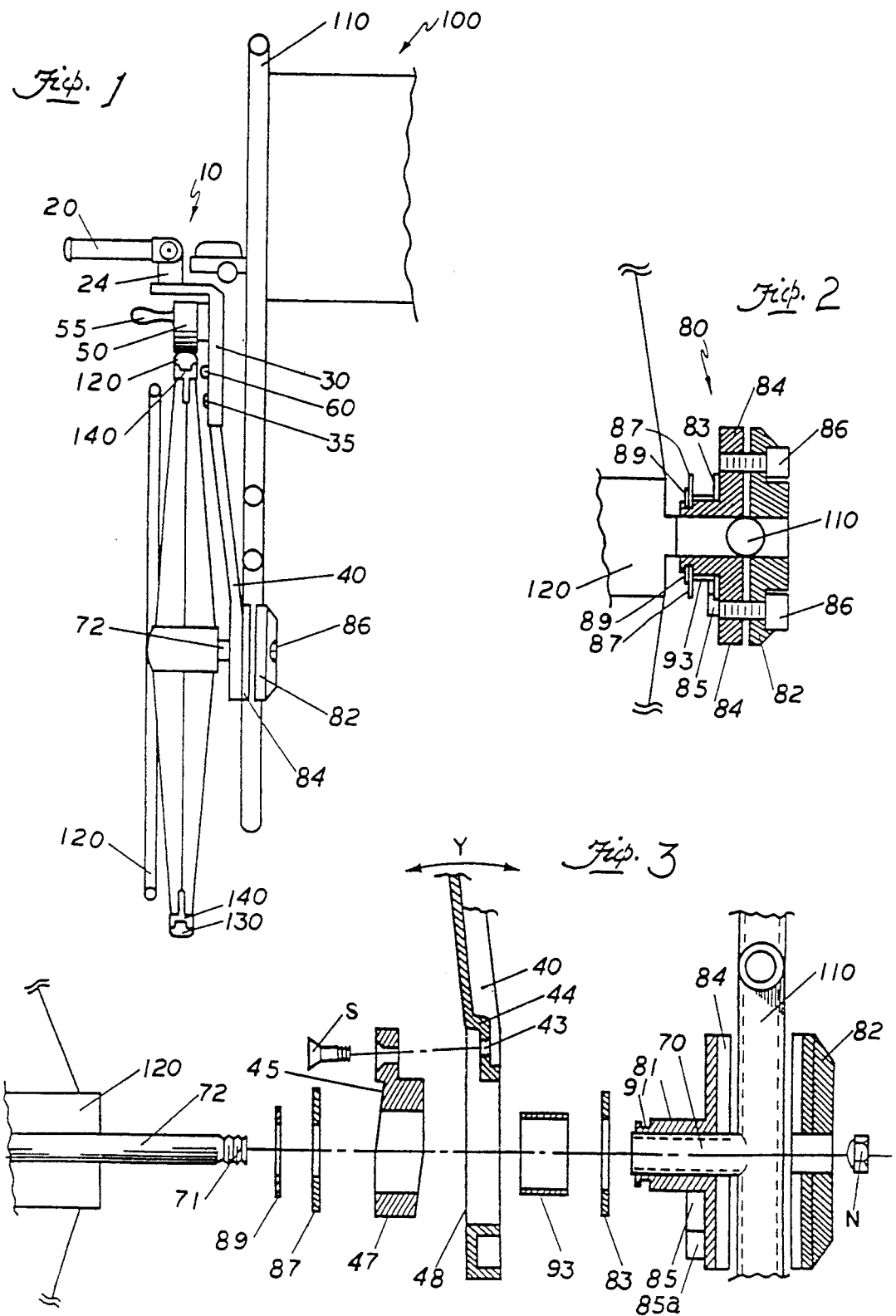

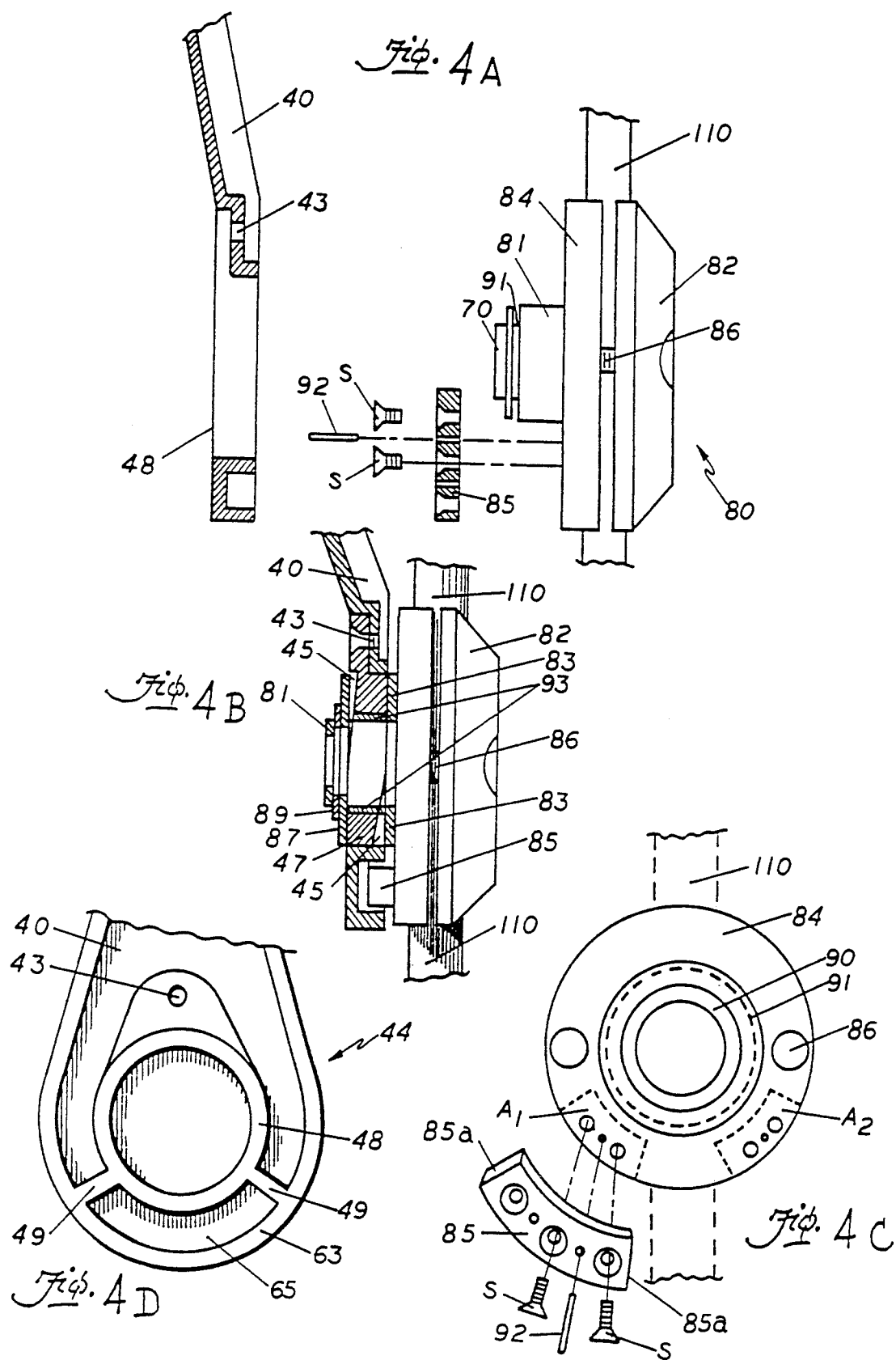

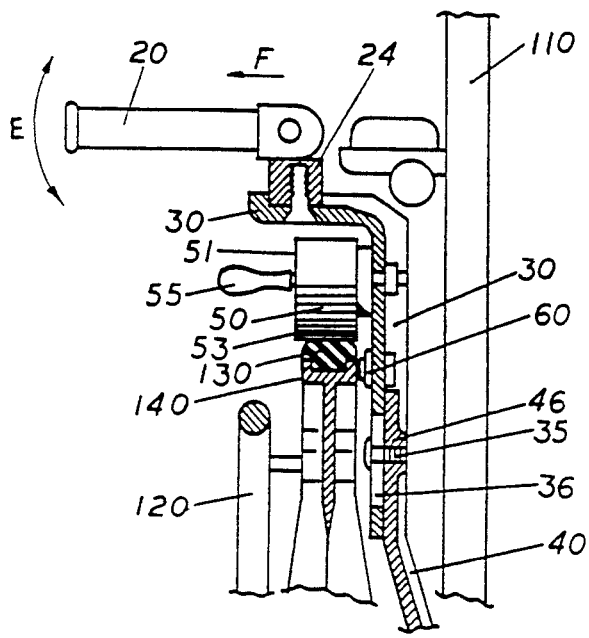
Fig. 5
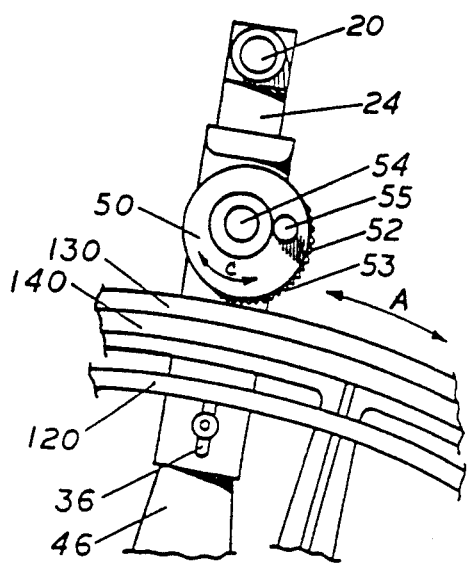
Fig. 6
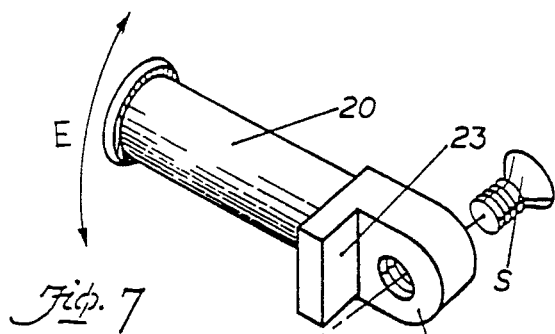
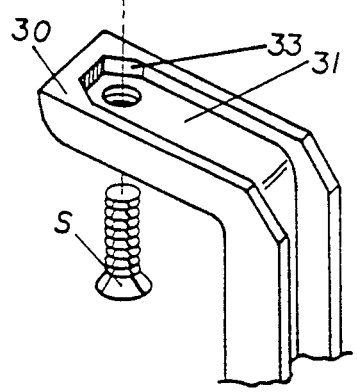
Fig. 7
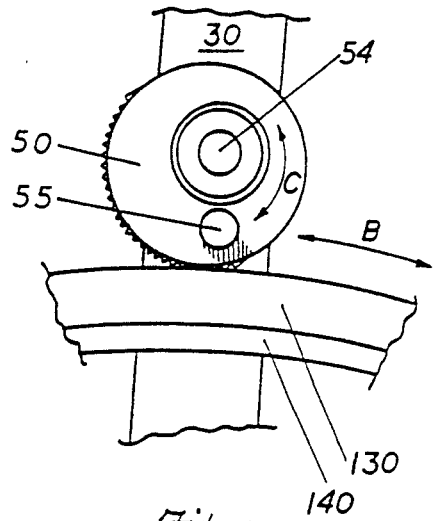
Fig. 8

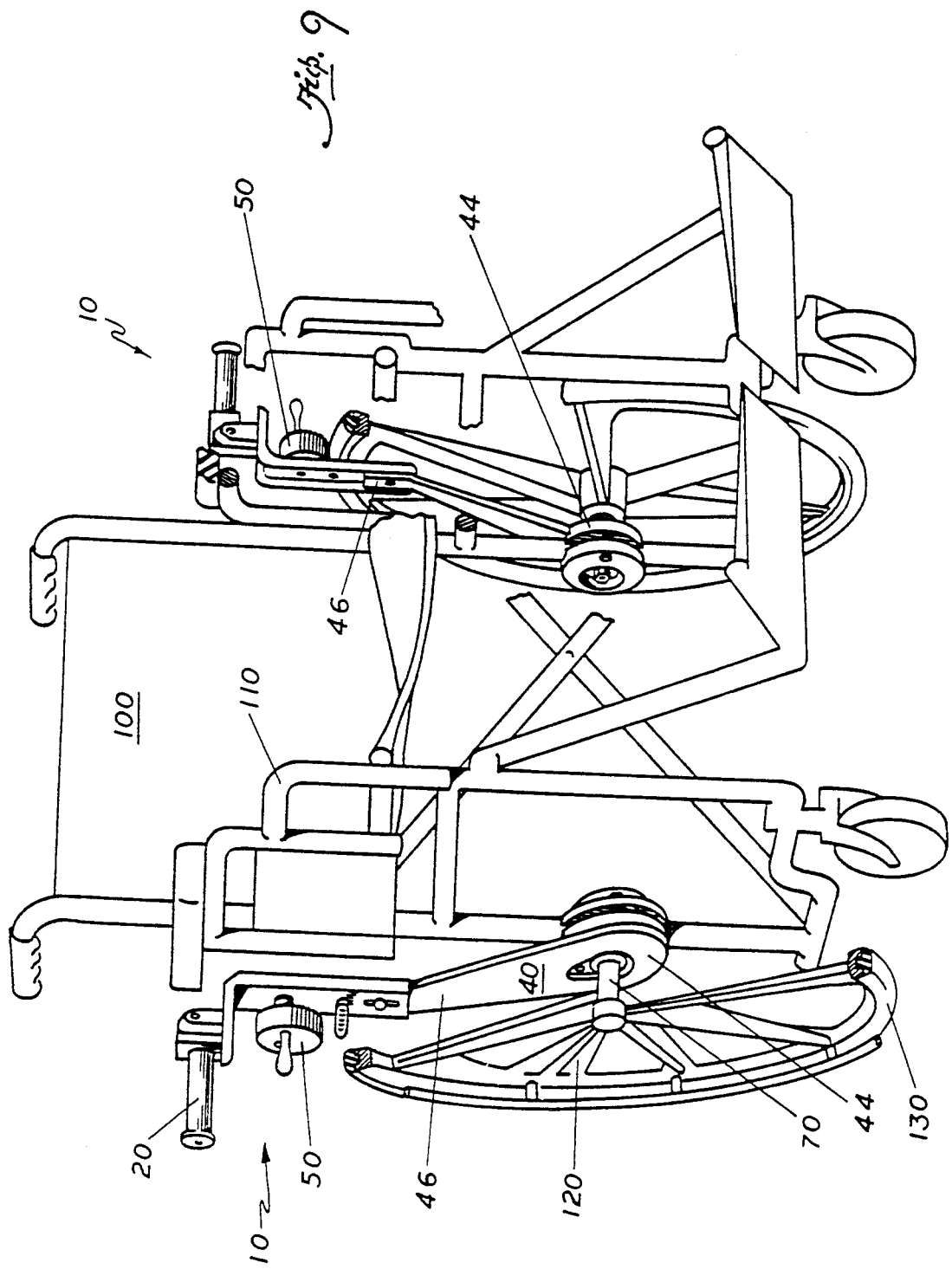

WHEELCHAIR DRIVER AND BRAKING SYSTEM

FIELD OF THE INVENTION

The following invention relates to devices for manually moving a wheelchair with the user in the wheelchair providing the motivating force. More specifically, this device relates to wheelchair movement devices which allow the user to push on levers to cause wheelchair motion without requiring the user to continually grip and release any moving parts.

BACKGROUND OF THE INVENTION

The usual method of wheelchair movement is for the user to grip circular handrails fixedly mounted to the outside of the wheelchair's wheels. To do this, the user must continually grab, push and release the handrail. For many users, this action is very difficult or even physically impossible. Many devices in the art provide alternative wheelchair moving means which do not require the user to continually grip and release moving parts. Each of these devices in the prior art have disadvantages not shared by the device of this application. Some of the prior art devices restrict the free motion of the wheels increasing rolling resistance of the wheels and increasing the physical exertion required to move the wheelchair. Other devices in the prior art extend outside the wheels of the wheelchair increasing the width of the wheelchair and making the wheelchair more cumbersome to maneuver in tight spaces. Still other devices in the prior art require extensive mechanical modification of the wheelchair and hamper standard adjustments of the wheelchair increasing the cost and complexity of maintenance and repair of the wheelchair.

The following patents reflect the state of the art of which applicant is aware and are included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
|---|---|---|
| Krueger, T. F. | 654,986 | July 31, 1900 |
| Williams, T. E. | 838,228 | December 11, 1906 |
| Everest et al | 2,643,898 | June 30, 1953 |
| Bulmer, D. L. | 3,869,146 | March 4, 1975 |
| Lucken, W. O. | 4,453,729 | June 12, 1984 |
| Korosue, A. | 4,506,900 | March 26, 1985 |
| Tait, R. E. | 4,735,431 | April 5, 1988 |

The patent to Bulmer teaches a device for moving a wheelchair without requiring the user to grip and release any moving parts. Bulmer is distinguishable from the device of this application in that the Bulmer device places the main lever arm outside the wheel on each side of the wheelchair. This increases the width of the wheelchair and increases the likelihood that the lever will catch on a passing object. Also, the lever of the Bulmer device is of a material flexible enough to allow the brake pad to engage the rim of the tire. This requires a material of sufficient flexibility.

The present invention utilizes a rigid lever with flexibility designed into the interface between the lever and its spindle sleeve. Furthermore, the device of this application has a spindle sleeve upon which the lever is mounted which isolates the lever from the wheel. This feature prevents the lever from interfering with the free rotation of the wheel and also allows the wheel to be easily removed or adjusted without removal of the wheelchair driving device.

The pawl construction of the instant invention is further distinguished over the pawl construction of the Bulmer device in that the curved toothed surface of the instant device more easily grips and releases the tires of the wheelchair. The construction of the pawl of the instant invention utilizes gravity to engage and release the pawl's curved toothed surface from the surface of the tire. This feature lessens the force necessary to engage and release the wheelchair driver while causing less wear to the tires. A corollary benefit to the curved tooth surface manifests itself when the chair travels in reverse.

The invention by Everest is of interest in that it has levers which the user can keep his or her hands on at all times. The device of this application is distinguishable from Everest in that the Everest patent requires substantial modification to the wheels of the wheelchair and also the Everest invention requires that the user learn to coordinate the power strokes of each lever together in alternating patterns while the device of this application allows a user to establish a motion pattern that is the most convenient, such as pushing together with both hands simultaneously. Furthermore, the Everest device lacks the simplicities of action associated with a pawl attached to a lever.

The patent to Tait provides a device which includes a lever which drives wheels of a wheelchair. The Tait device is substantially different from the device of this application in that it requires substantial modification of the standard wheelchair, requiring that gears and belt or chain drives be mounted on the wheelchair. The device of this application is easily attachable to a standard wheelchair and avoids interfering in any way with the existing operation of the wheelchair.

The other prior art patents listed above diverge more starkly from the present invention than those specifically distinguished. The device of this application provides a unique and useful method of modification of a wheelchair to provide users with limited physical abilities with a means for transporting themselves without assistance.

SUMMARY OF THE INVENTION

This wheelchair driver is, in essence, a simple lever arm which is mounted to a horizontally oriented portion of the frame which supports the wheels of a wheelchair through a spindle sleeve. The lever arm has a lever collar on an axial end of the lever arm adjacent to the spindle sleeve. The lever collar is sized to fit over the spindle sleeve. The spindle sleeve provides a race upon which the lever collar can run providing the lever with a low friction rotational interface. The spindle sleeve restricts the axial end of the lever arm from translation along the horizontal frame portion ensuring that the wheelchair's wheel rotation is not hampered.

To install the wheelchair driver, both wheels are removed and a driver is installed on each side of the chair and then the wheels are replaced. Each lever has a handle mounted on an orbiting end of the lever opposite the axial end. Each handle is adjustable to conform to the palm of a user's hand for maximum comfort and utility. A rotating pawl is mounted on the lever in a proper position to contact the upper surface of the tire of each wheel. The surface of the pawl which contacts the tire is serrated so that when the user pushes forward on the lever, teeth of the pawl grip each of the wheels and transfers rotational force to each wheel. After the power stroke in one direction (e.g. forward), the user pulls back the lever towards his or her body and the pawl automatically releases the tire and pivots out of the way to allow the wheelchair's momentum to carry the wheelchair along without interference. Therefore, the user simply pumps the wheelchair along by pushing the handles and then by bringing them back and then by pushing again.

The handles can be fitted with a variety of devices, such as straps, to hold the user's hands in place. The lever is designed to allow a slight "rocking" movement which is outwardly perpendicular to the forward and backward oscillatory motion of the lever as it rotates about the spindle sleeve attached to the wheelchair frame on a power stroke. Brake pads are attached to the lever adjacent the wheel rims which hold the tires of the wheel. When the levers are thusly pushed outwardly perpendicular to the power stroke, the brake pads abut against the rims of the wheels, causing the speed of the wheelchair to be reduced.

The wheelchair driver is easily attachable to the wheelchair frame by merely removing the wheels, installing the spindle sleeve, installing the driver and reinstalling the wheels. The levers can also be adjusted in length allowing the pawls to effectively interface with the tires of the wheels and still be comfortable for the user to grip. Once attached and adjusted the wheelchair drivers are ready for use.

OBJECTS OF THE INVENTION

Accordingly, it is a primary object of the present invention to provide a device which allows a wheelchair user to move the wheelchair without assistance and without requiring the coordination necessary to continually grip and release a moving part of the wheelchair.

Another object of the present invention is to provide a device as characterized above which is easy to install on a standard wheelchair.

Another further object of the present invention is to provide a wheelchair motion device which is low in friction allowing the wheelchair to roll easily and efficiently.

Another further object of the present invention is to provide a wheelchair motion device which requires little force for effective movement, benefiting a user of limited physical ability.

Another further object of the present invention is to provide a wheelchair motion device which is safe to operate and keeps the users hands well away from any dangerous mechanical parts.

Another further object of the present invention is to provide a wheelchair motion device which is durable, and requires little maintenance.

Another further object of the present invention is to provide a wheelchair motion device which is constructed of materials and is of a design lending itself to easy mass manufacturing techniques.

Another further object of the present invention is to provide a wheelchair motion device of simple construction, providing for easy repairs and modifications thereof.

Another further object of the present invention is to provide a wheelchair motion device which is adjustable for modification to conform to a user's personal preferences.

Another further object of the present invention is to provide a wheelchair motion device which is simple in operation allowing a user to easily learn how to utilize it in both a forward and rearward direction.

Viewed from a first vantage point it is an object of the present invention to provide a device for efficiently manually imparting motion to a wheelchair comprised of a lever pivotally attached to a spindle of the wheelchair between a frame and a wheel of the wheelchair, a wheel gripping means attached to the lever, and a lever rotational input means attached to the lever; whereby the lever may be rotated about the spindle when force is applied to the lever rotational input means by a user causing the wheel gripping means to grip a tire on the wheel resulting in rotation of the wheel of the wheelchair.

Viewed from a second vantage point it is an object of the present invention to provide a wheelchair having an easily operable manual translation system comprised of a chair mounted upon axles having two large primary wheels and a plurality of wheelchair drivers mounted upon the spindle between the chair and the wheels, each of the drivers having a lever rotatably attached to the spindle on an axial end of the lever, a handle on an orbiting end of the lever and a pawl rotatably extending from the lever over a tire of the wheel at a distance from the spindle sleeve equal to the distance from the spindle sleeve to the tire; whereby a user sitting in the wheelchair can move the wheelchair by pushing on handles of the drivers causing the pawls to engage the tires of the wheels of the chair.

Viewed from a third vantage point it an object of the present invention to provide a kit for adding a means of manually driving a wheelchair comprised of a plurality of spindle sleeves mountable to a spindle of the wheelchair between wheels and the frame of the wheelchair, a plurality of levers mountable, on an axial end thereof over a lever collar which is fixed onto the spindle sleeves. The lever extends upward to an orbiting end located between the wheels and the frame of the wheelchair. A plurality of handles are attached to the orbiting ends of the levers and are designed to be oriented in a variety of different configurations for ease of engaging by a user, and a plurality of pawls are rotatably attached to the levers near the orbiting ends in an orientation allowing the pawls to grip tires mounted on the wheels; whereby a user may engage the handles and cause the levers to rotate about the spindle of the wheelchair on the spindle sleeves causing the pawls to engage the tires and causing the wheels to rotate thereby causing the wheelchair to translate linearly along a surface.

DESCRIPTION OF THE DRAWING FIGURES

FIG. 1 is a front view of the device of this application mounted on one wheel of a wheelchair.

FIG. 2 is a top view of a portion of that which is shown in FIG. 1.

FIG. 3 is an exploded parts view of the device of this application in section revealing details which allow the lever to "rock" engaging and disengaging the brake.

FIG. 4a is an exploded parts view revealing details of a portion of this application.

FIG. 4b is a cutaway front view of a portion of the device.

FIG. 4c is a side view of portion of the device with some parts exploded to reveal details.

FIG. 4d is a side view of a portion of the device.

FIG. 5 is a front view detail of an upper portion of the device of this invention.

FIG. 6 is a side view detail of an upper portion of the device of this invention.

FIG. 7 is an exploded parts view of an upper portion of the device.

FIG. 8 is a side view similar to that which is shown in FIG. 6 in a second position.

FIG. 9 is a perspective view of the apparatus mounted around both wheels of a wheelchair.

DESCRIPTION OF PREFERRED EMBODIMENTS

Referring now to the drawing figures (e.g. FIG. 9) wherein like reference numerals represent like parts throughout, numeral 10 refers to a wheelchair driver. The driver 10 is attachable to a wheelchair 100 providing motion to the wheelchair 100. In essence, the driver 10 has a lever 40 attached to a spindle sleeve 80 fastened to the frame 110 on an axial end 44 of the lever 40 adjacent the spindle sleeve 80 and has a handle 20 on an orbiting end 46 of the lever 40 remote from the spindle sleeve 80. A pawl 50, attached along the lever 40, interfaces with a tire 130 mounted on a wheel 120. When a wheelchair occupant applies force to the handle 20, the lever 40 rotates about the spindle sleeve 80 and the pawl 50 engages the tire 130 causing the wheel 120 to rotate, thus causing the wheelchair 100 to move.

More specifically, the lever 40 is an elongate rigid structure having the axial end 44 located around the spindle sleeve 80 of the wheelchair 100 with the orbiting end 46 located above the spindle sleeve 80 and between the wheel 120 and a frame 110 of the wheelchair 100.

The spindle sleeve 80 is formed from an inside spindle sleeve half 82 and an outside spindle sleeve half 84. The two halves 82, 84 fasten together around the frame 110 and a horizontal frame extension 70 which receives an axle 72 of the wheel 120. The two halves 82, 84 are fastened by spindle sleeve fasteners 86, preferably bolts within threaded holes in the halves 82, 84.

The spindle sleeve 80 surrounds a junction of the frame 110 and the horizontal frame extension 70. The axle 72 of the wheel 120 is not contacted by the sleeve 80 but rather passes through an interior of the horizontal frame extension 70 along a line horizontal and perpendicular to wheelchair 100 motion. A nut N retains the axle 72 within the horizontal frame extension 70 and also remains clear of the spindle sleeve 80. Thus, while the sleeve 80 is near the wheel 120 frame 110 junction, it does not interfere with these existing wheelchair 100 parts at all.

The axle 72 has a threaded end 71 which passes through the frame 110 and is retained via a nut N. The axial end 44 of the lever 40 connects over the spindle sleeve 80 where the spindle sleeve 80 extends to form a boss 81 covering the horizontal frame extension 70. The axial end 44, shown in detail in FIGS. 3, 4a, 4b and 4d, is provided with a lever collar 48 which defines a circular hole. The hole is sized to fit over the boss portion 81 of the spindle sleeve 80 shown in FIGS. 2, 3 and 4a.

The outside half 84 of spindle sleeve 80 supports a washer 83, an inner race 93, a washer 87 and a lock ring 89 within groove 91 formed on boss 81. The lock ring 89 retains the washers 83, 87 and inner race 93 upon the boss 81. These parts restrain the axial end 44 of the lever 40 from translation along and off the boss 81 of the spindle 80. These parts also provide low friction contact surfaces for free rotation of the axial end 44 of the lever 40 about the boss 81 of the spindle sleeve 80. The washer 87 abuts against the lock ring 89 in one side and a lever arm bearing 47 on the other side. The bearing 47 is interposed between the inner race 93 of the boss 81 and the hole defined by the collar 48. Bearing 47 fastens to the axial end 44 by a screw S which fastens into the threaded hole 43 in the axial end 44.

The bearing 47 which therefore supports the axial end 44 of the lever 40 includes both play on the boss 81 and clearance on its sides embodied as two beveled notches 45 (FIG. 3) of equal size, one on an outer upper surface and another on an inner lower surface. The notches 45 and the center bore are sized to allow the lever 40 to pivot "outward" enough, i.e. along arrow Y, to cause a brake pad 60 to impact a rim 140 causing the wheelchair 100 to slow down. The notches 45 thus provide one form of a clearance means for the lever. Further details of the brake follow infra.

The lever arm axial end 44 includes webs 49 which extend radially from the collar 48 as shown in FIG. 4D. A drive socket 65 is formed between the webs 49, the collar 48 and the lever flange 63. The socket 65 loosely fits over a restricting plate 85 which curves to maintain a constant distance from the horizontal frame extension 70. The length of the restraining plate 85 is calculated to limit the lever 40 from full rotation around the horizontal frame extension 70. This lever 40 motion range extends from where outer radial edges 85a of the plate 85 abut with the webs 49 at extremities of the lever 40 travel. Thus, the range of motion of lever 40 is determined by the clearance between plate 85 and webs 49 and the plate 85 and webs 49 provide one form of a lever rotation restricting means.

Note that the restricting plate 85 is placed on the outer half 84 of spindle sleeve 80 and facing the lever arm axial end 44 preordains the length of the arc of travel of the lever 40 and handle 20. Screws S fix the restraining plate 85 in, either of two areas, $A_1$, $A_2$ which determine right or left side lever 40 orientation on the wheelchair 100. FIG. 4 shows three holes for screws in plate 85, two of which align with holes on area $A_1$, or $A_2$. The additional two holes in plate 85 are for the roller pin 92 which passes between plate 85 and half 84 to dissipate imposed loads in use.

A handle base bracket 30, shown in detail in FIGS. 5 and 6, is adjustably interposed between both the orbiting end 46 of the lever 40 and the handle 20. The bracket fastener 35 fastens the handle based bracket 30 to the orbiting end 46 of the lever 40 in any one of a variety of different horizontal plane orientations, allowing the driver 10 to be adjusted to variable wheel 120 sizes.

A vertical slot 36 in the bracket 30 allows the bracket to move along the length of the slot 36 when the fastener is loosened. The handle 20 is rotatably attached to a handle base 24 to allow rotation of the handle 20 about its axis of connection there between (i.e. along arrows E). The handle base 24 is fastened to the upper end of the bracket 30 and can be reoriented about axis "L". More specifically, base 24 resides within a trough 31 formed on a top surface of a horizontal leg of an inverted substantially "L" shaped bracket 30. The bracket 30 has a vertical leg which connects to the orbiting end 46 of lever 40. The trough 31 has at least one facet 33 which abuts against the base 24 so that when a screw S fastens the base to the trough 31, the base 24 will not rotate. The facet 33 contacts at least one facet of a sidewall of base 24 for secure engagement when screw S clamps the base 24 to the trough 31.

An upper end of the base 24 has upwardly projecting ear 37 and a medially disposed shelf 38. Ear 37 contacts a complemental tab 21 on the handle 20 and a handle abutment 23 can contact the base 24 for added secureness when the handle 20 is screwed to the base 24. Thus, the handle 20 extends from the bracket 30 in a horizontal direction orthogonal to wheelchair 100 travel unless the handle 20 is pivoted vertically for greater utility to the wheelchair occupant.

In an alternative embodiment, the handle 20 is equipped with straps or other fasteners (not shown) which keep the hands of the occupant in contact with the handle 20.

The pawl 50 is also rotatably attached to the bracket 30. Please see FIG. 6. The pawl 50 fastens to the bracket 30 below the handle 20 and extends from the bracket 30 over the wheel 120. The pawl 50 is a somewhat circularly shaped construct mounted off-center on the vertical leg of bracket 30. In essence, it has an upper end 51 which fastens through a pivot point 54 to the bracket 30 in a rotatable fashion about arrow C, and a lower end 53. The lower end 53 has teeth 52 shaped to securely grip the tire 130 of the wheel 120. A handle 55 allows orientation of the pawl 50 into one of three positions—one for forward drive of the wheelchair (FIG. 6) and the other for rearward drive (FIG. 8) or a neutral non-drive position (not shown). The offset nature of the pawl 50 and the two drive positions provides bite in the wheel 120. The pawl 50 thus provides one form of a wheel gripping means for the lever 40.

Fixedly attached to the bracket 30 is a brake pad 60, shown in detail in FIG. 5. The brake pad 60 is located adjacent to a rim 140 of the wheel 120. The brake pad 60 does not touch the rim 140 under driving conditions due to the lever 40 being pulled in towards the chair center by virtue of the clearance provided with clearance notches 45 in the bearing 47 (FIG. 3).

In use and operation (depicted in FIGS. 1, 4B, 5, 6, 8 and 9), the driver 10 functions in the following manner when installed on a wheelchair 100. To go forward the lever 40 begins in a rearward position and the pawl 50 is as shown in FIG. 6. The occupant grips the handle 20 and applies force in a forward direction. The handle 20 thus acts as one form of a lever rotational input means. The lever 40 then begins to rotate about the spindle boss 81, along arrow A. The teeth 52 of the pawl 50 bite into the tire 130 as the pawl 50 pivots about arrow C. The action of the pawl 50 and the teeth 52 cause the lever 40, handle 20 and wheel 120 to all rotate together along arrow A. The wheel 120 rotates along arrow A causing the wheelchair 100 to move. As the occupant continues to apply force to the handle 20 the wheel 120 continues to rotate. To go in reverse the pawl is rotated along arrow C as depicted in FIG. 8 and the driver 10 is moved from a forward to a rearward position along arrow B.

During lever rotation along arrows A or B, the lever arm 40 is limited in motion by the restricting plate 85 contacting the web 49. Eventually the web 49 contacts the end 85a of the plate 85 or the occupant stops pushing or pulling the handle 20. The wheel 120 then rotates without further lever 40 motion (due to wheelchair 100 momentum) without the pawl 50 biting into the tire 130 and remains slightly out of engagement with the tire 130. Even with the pawl 50 released and the wheel 120 still rotating, the occupant can apply a rearward non-driving force to the handle 20 causing the lever 40 to return to its starting, rearward position. The occupant can then repeat the above process. With each driving rotation of the lever 40, more force is applied tangentially to the wheel 120 increasing the speed of the wheelchair 100.

If the occupant wishes to decrease the speed of the wheelchair 100, the occupant can apply a force outward along arrow F on the handle 20. This causes the lever 40 to pivot outward, perpendicular to the forward and rearward motions described above. The lever 40 can pivot outward as permitted by the beveled notches 45. This outward pivoting causes the brake pad 60 to engage the rim 140 of the wheel 120. Friction between the brake pad 60 and the rim 140 causes the wheel 120 to slow down which causes the wheelchair 100 to slow down.

To back up the wheelchair, the pawl 50 assumes the FIG. 8 position by moving the handle 55 counter-clockwise. This causes the teeth bias to grab in the opposite direction and permits reverse drive rotation.

The handle 20 is rotatable along arrow "L" and arrow "E". The handle 20 can be locked into position in the desired location or allowed to rotate freely during driver 10 use.

For efficient movement of the wheelchair 100 it should be equipped with a driver 10 on each side of the wheelchair 100 as in FIG. 9 so each large wheel 120 is being driven. This configuration prevents the wheelchair 100 from turning due to unequally applied forces. Furthermore, this configuration allows tight rotation of the wheelchair 100 when one driver 10 is braked or reversed and the other driver 10 on the opposite side is in a forward mode.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A device for manually imparting motion to a wheelchair comprising, in combination:
   a lever pivotally attached to a spindle sleeve fixedly attached to a horizontal frame portion of the wheelchair concentric with a wheel's axle between the frame and said wheel of the wheelchair,
   a wheel-gripping means attached to said lever, and
   a lever rotational input means attached to said lever;
   whereby said lever may be rotated about said sleeve when force is applied to said lever rotational input means causing said wheel-gripping means to grip a tire on the wheel resulting in rotation of the wheel of the wheelchair.

2. The wheelchair motion device of claim 1 wherein said device has a lever rotation restricting means coupled to said lever, whereby rotation of said lever is restricted to a finite arc.

3. The wheelchair motion device of claim 2 wherein said device has a wheelchair braking means supported by said lever, whereby said device provides the user with a means to stop the wheelchair.

4. A device for manually imparting motion to a wheelchair comprising, in combination:

a lever pivotally attached to a horizontal frame portion of the wheelchair concentric with a wheel's axle between the frame and said wheel of the wheelchair, a wheel-gripping means attached to said lever, and a lever rotational input means attached to said lever;

whereby said lever may be rotated about the axle when force is applied to said lever rotational input means causing said wheel-gripping means to grip a tire on the wheel resulting in rotation of the wheel of the wheelchair;

wherein said device has a lever rotation restricting means coupled to said lever, whereby rotation of said lever is restricted to a finite arc;

wherein said device has a wheelchair braking means supported by said lever, whereby said device provides the user with a means to stop the wheelchair;

wherein said lever is attached to the horizontal frame portion on an axial end of said lever through a lever collar surrounding a spindle sleeve fixedly attached to the horizontal frame portion of the frame, said spindle sleeve providing a race upon which said lever collar can run and said spindle sleeve restricting said lever from translation axially along the horizontal frame portion, whereby said lever is allowed to rotate freely around said spindle sleeve but is restricted from translation preventing said lever from interfering with the wheel's rotation at said axial end.

5. The wheelchair motion device of claim 4 wherein said lever rotation restricting means is an arcuate restricting web on said axial end of said lever and a restricting plate attached to said spindle sleeve and residing adjacent said restricting web;

whereby rotation of said lever around said spindle sleeve is restricted to an arc of finite width defined by clearance between said restricting web and said plate.

6. The wheelchair motion device of claim 5 wherein said lever rotational input means is a handle, said handle attached to an orbiting end of said lever opposite said axial end.

7. The wheelchair motion device of claim 6 wherein said handle is pivotally mounted to said lever allowing said handle to be positioned in a variety of different orientations, whereby said handle can be adjusted for maximum convenience and comfort.

8. The wheelchair motion device of claim 7 wherein said lever includes length adjusting means allowing said driver to be modified to fit wheelchairs having different diameter wheels.

9. The wheelchair motion device of claim 8 wherein said wheel-gripping means is a pivoting pawl having means to reversibly set teeth oriented to bite into the tire when said lever is rotated in one direction and shaped to pivot, releasing the tire, when rotated in reverse;

whereby when a user rotates said lever in said one direction, said pawl engages the tire of the wheel causing the wheel to rotate and whereby when a user rotates said lever in an opposite direction, said pawl releases the tire allowing the wheelchair to continue under momentum until said lever is again rotated in said one direction.

10. The wheelchair motion device of claim 9 wherein said pawl is shaped to securely grip the tire without slippage and to easily release from the tire when appropriate;

whereby said pawl has maximum tire-gripping abilities when moving forward and maximum tire-releasing ability when moving backward.

11. The wheelchair motion device of claim 10 wherein said braking means is a brake pad attached to said lever near said orbiting end at a location adjacent to a rim of the wheel and a plurality of clearance means on a bearing of said lever near said axial end at a location adjacent to said spindle sleeve, said clearance means allowing said lever to pivot slightly in a direction perpendicular to both the forward and rearward rotational directions, allowing said brake pad to impact the rim;

whereby the user can stop the wheelchair by pushing said handle toward the wheel.

12. A wheelchair having an easily operable manual translation system comprising, in combination:

a chair mounted on axles having two large primary wheels, and a plurality of wheelchair drivers mounted upon a horizontal portion of the wheelchair's frame between said chair and said wheels which surrounds and supports said axles, each of said drivers having:

a lever having an axial end rotatably attached to a spindle sleeve fixedly attached around said horizontal portion of the wheelchair's frame, a handle on an orbiting end of said lever said orbiting end remote from said axial end, and a pawl rotatably extending from said lever over a tire of said wheel at a distance from said spindle sleeve equal to the distance from said spindle sleeve to said tire;

whereby a user sitting in said wheelchair can move said wheelchair by pushing on said handles of said drivers causing said pawls to engage said tires of said wheels of said wheelchair.

13. The translatable wheelchair of claim 12 wherein said axial ends of said levers are shielded from said wheels where said wheels mount to said axles by said plurality of spindle sleeves, each said spindle sleeve interposed between said horizontal portion and said axial end of said lever, whereby rotation of said wheels is not affected by said axial ends of said levers.

14. The translatable wheelchair of claim 13 wherein said pawls have teeth including means to securely grip said tire in a first direction of relative translation without slippage and to easily release from said tire upon relative translation in a second direction opposite to said first direction;

whereby said pawl has maximum tire gripping ability when moving in said first direction and maximum tire releasing ability when moving in said second opposite direction, and means to switch from forward gripping to reverse gripping.

15. The translatable wheelchair of claim 14 wherein said handles are pivotally mounted to said levers on said orbiting ends allowing said handles to be positioned in a variety of different orientations, whereby said handles can be adjusted for maximum convenience and comfort of said wheelchair.

16. The translatable wheelchair of claim 15 wherein said levers of said drivers have brake pads positioned adjacent to rims of said wheels and said axial ends of said levers have clearance means which allow said levers to pivot slightly in a direction perpendicular to both the forward and rearward rotation direction, allowing said brake pads to impact said rims of said wheels; whereby the user can stop the wheelchair by pushing said handles outward toward said wheels.

17. A kit for adding a means of manually driving to a wheelchair comprising, in combination:
- a plurality of spindle sleeves mountable to a horizontal axle receiving portion of the wheelchair between wheels and a frame of the wheelchair,
- a plurality of levers, each having axial ends and orbital ends, said axial ends each having a lever collar carried on said spindle sleeves and extending upward to said orbiting end located between the wheels and the frame of the wheelchair,
- a plurality of handles attached to said orbiting end of said levers designed to be oriented in a variety of different configurations for ease of engaging by a user, and
- a plurality of pawls rotatably attached to said levers near said orbiting ends in an orientation allowing said pawls to grip tires mounted on the wheels;
- whereby a user may engage said handles and cause said levers to rotate about the axles of the wheelchair on said spindle sleeves causing said pawls to grip the tires causing the wheels to rotate and causing the wheelchair to translate linearly along a surface.

18. The wheelchair driver kit of claim 17 wherein said levers have brake pads positioned adjacent to rims of the wheels and said axial ends of said levers have clearance means which allow said levers to pivot slightly in a direction perpendicular to both the forward and rearward rotation directions, allowing said brake pads to impact the wheels;
- whereby the user can stop the wheelchair by pushing said handles outward against the rims of the wheels.

19. The wheelchair driving kit of claim 18 wherein said spindle sleeves provide a race upon which lever collars on said axial ends of said levers can run and said spindle sleeves restrict said levers from translation along the axles, whereby said levers are allowed to rotate freely around the axles but are restricted from translation along the axles preventing said levers from interfering with the wheels' rotation at said axial ends of said levers.

20. The wheelchair driving kit of claim 19 wherein said pawls have teeth configured to securely grip the tires without slippage and to easily release from the tires when appropriate;
- whereby said pawls have maximum tire-gripping ability when moving in one direction and maximum tire releasing ability when moving in an opposite direction,
- and means to reverse said gripping ability.

21. A device for manually imparting motion to a wheelchair comprising, in combination:
- a lever pivotally attached to a horizontal frame portion of the wheelchair concentric with a wheel's axle between a frame of the wheelchair and said wheel of the wheelchair,
- a wheel-gripping means attached to said lever, and
- a lever rotational input means attached to said lever;
- whereby said lever may be rotated about the axle when force is applied to said lever rotational input means causing said wheel-gripping means to grip a tire on the wheel resulting in rotation of the wheel of the wheelchair,
- wherein said lever is attached to the horizontal frame portion on an axial end of said lever through a lever collar surrounding a spindle sleeve fixedly attached to the horizontal frame portion of the frame, said spindle sleeve providing a race upon which said lever collar can run and said spindle sleeve restricting said lever from translation axially along the horizontal frame portion,
- whereby said lever is allowed to rotate freely around said spindle sleeve but is restricted from translation preventing said lever from interfering with the wheel's rotation at said axial end.

22. A wheelchair having an easily operable manual translation system comprising, in combination:
- a chair having a frame supporting an axle means and having two large primary wheels supported on said axle means, and
- a plurality of wheelchair drivers mounted upon a horizontal portion a said wheelchair frame between said chair and said wheels which surrounds and supports said axle means, each of said drivers having:
- a lever having an axial end with a collar therein defining a hole passing through the axial end, said collar oriented with said horizontal portion of the wheelchair's frame passing therethrough, and
- a wheel-gripping means attached to each said lever;
- whereby said levers can be rotated about said horizontal portion of the wheelchair's frame and impart motion to each said wheel through said wheel-gripping means without physical contact with said axle means.

* * * * *